United States Patent

[11] 3,586,075

| [72] | Inventor | Vern O. Larsen |
| | | 2640 Bonnie Bra, Casper, Wyo. 82601 |
| [21] | Appl. No. | 758,892 |
| [22] | Filed | Sept. 10, 1968 |
| [45] | Patented | June 22, 1971 |

[54] MITER CUTTING DEVICE
6 Claims, 12 Drawing Figs.

[52] U.S. Cl. .................................................... 143/6,
143/86, 143/90
[51] Int. Cl. ...................................................... B27b 5/20
[50] Field of Search .......................................... 143/6—43,
86, 89, 90, 47

[56] References Cited
UNITED STATES PATENTS

| 103,341 | 5/1870 | Jones.............................. | 143/90 X |
| 506,090 | 10/1893 | Beimling ...................... | 143/90 |
| 976,296 | 11/1910 | Robbins ....................... | 143/86 |
| 1,257,099 | 2/1918 | Nace et al. .................... | 143/89 |
| 3,151,641 | 10/1964 | Kimmel et al. ............... | 143/6 (43) |
| 3,410,324 | 11/1968 | Thompson.................... | 143/6 (43) |

*Primary Examiner*—Donald R. Schran
*Attorneys*—Clarence A. O'Brien and Harvey B. Jacobson ABSTRACT: A first embodiment of the present invention includes a raised platform having an arcuate slot formed in the central portion thereof. A radial arm guide is connected to the platform in a manner permitting angular displacement of the same. A workpiece is positioned against the preadjusted radial arm guide and the slot permits one's hand to grasp or clamp the workpiece against the guide while a saw traverses the workpiece thereby forming a miter cut therein. Means are provided for forming a compound angle cut when desired. A second embodiment includes a raised platform identical to that of the first embodiment. However, a triangular, instead of an arcuate, slot is centrally formed within the platform and guide rails are disposed coincidentally with the peripheral edges of the triangular slot. To form a miter cut in a workpiece, the workpiece is positioned against a triangular rail member and is clamped thereagainst by one's hand which passes through the triangular slot.

PATENTED JUN 22 1971

Vern O. Larsen
INVENTOR

BY Clarence A. O'Brien
and Harvey B. Jacobson
Attorneys

PATENTED JUN 22 1971 3,586,075
SHEET 2 OF 3
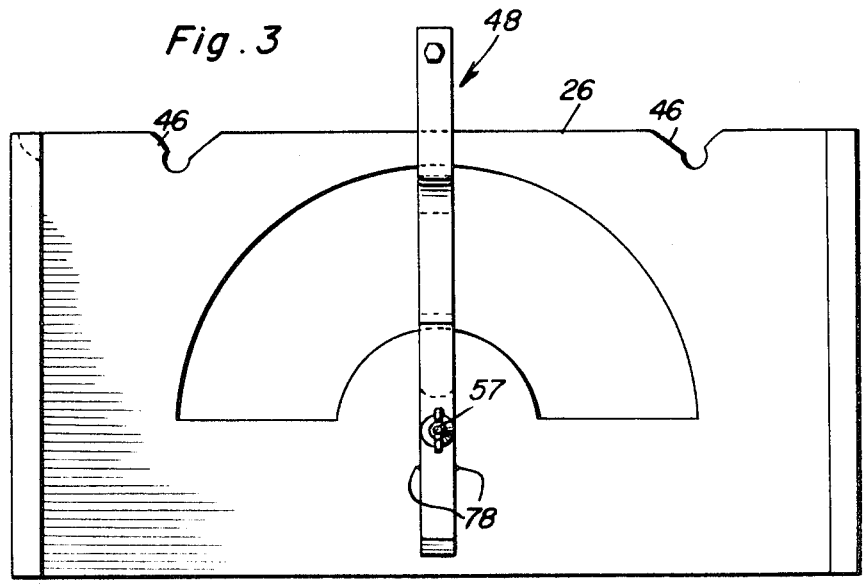
Fig. 3
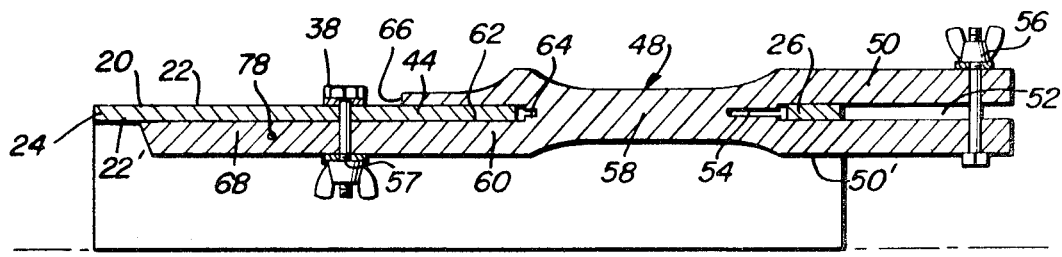
Fig. 4
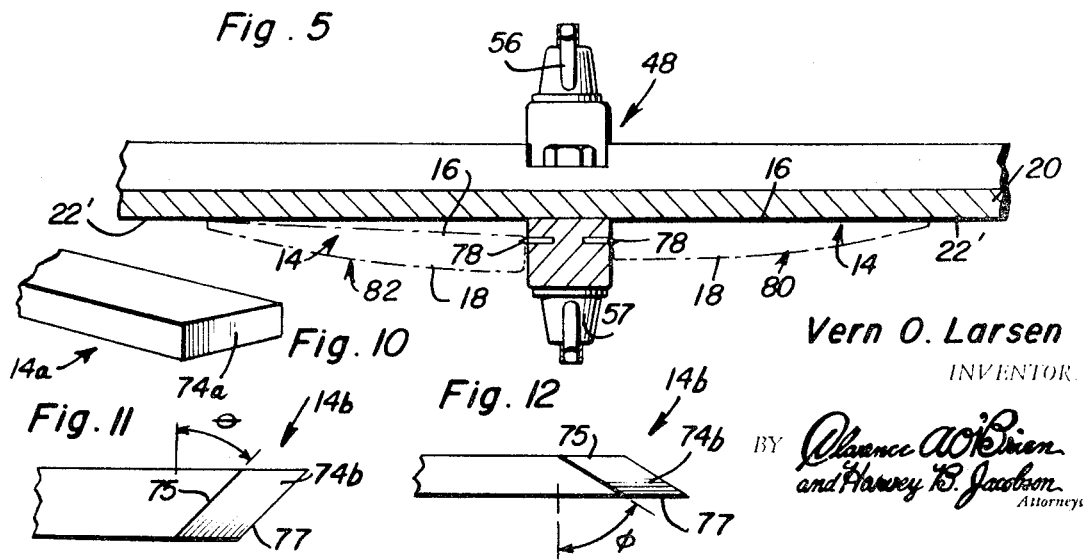
Fig. 5
Fig. 10
Fig. 11
Fig. 12
Vern O. Larsen
INVENTOR
BY Clarence A. O'Brien
and Harvey B. Jacobson
Attorneys Vern O. Larsen
INVENTOR

MITER CUTTING DEVICE

The present invention relates to miter boxes and more particularly to a miter cutting device for small workpieces.

In the past, a number of miter box designs have been conceived which permits the cutting of a workpiece at several predetermined angles. However, in instances where an odd angle cut is necessary, such a miter box lacks usefulness. Further, previous devices have required a time-consuming clampdown operation to prevent workpiece displacement during a cutting operation. Still further, prior simply constructed miter boxes lacked provision for cutting a compound angle which is particularly useful in the formation of molding miter joints.

The present invention includes two embodiments of a miter cutting device which permit the manual clamping of a workpiece against guide means. The first embodiment allows angular variation of the guide means so that a miter cut of any acute angle may be obtained. Further, the first embodiment includes means for positioning the workpiece with respect to the cutting device so that a compound angle may be cut.

The second embodiment of the present invention includes triangularly disposed guide means coincident with the periphery of a triangular slot cut within the platform of the cutting device. This embodiment permits rapid manual clamping of the workpiece. The triangular guide means permits the workpiece to be positioned at a 45° angle with respect to a saw blade thereby permitting formation of a conventional miter edge.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a bottom plan view of the present miter cutting device.

FIG. 4 is a transverse sectional view taken along a plane passing through section line 4-4 of FIG. 2.

FIG. 5 is a partial sectional view taken along a plane passing through section line 5-5 of FIG. 2.

FIG. 10 is a partial perspective view illustrating a conventional miter edge cut at a 45° angle.

FIG. 11 is a partial top plan view of an edge having a compound cut formed therein.

FIG. 12 is a partial front elevational view illustrating the compound cut of the edge shown in FIG. 11.

Figure 1:
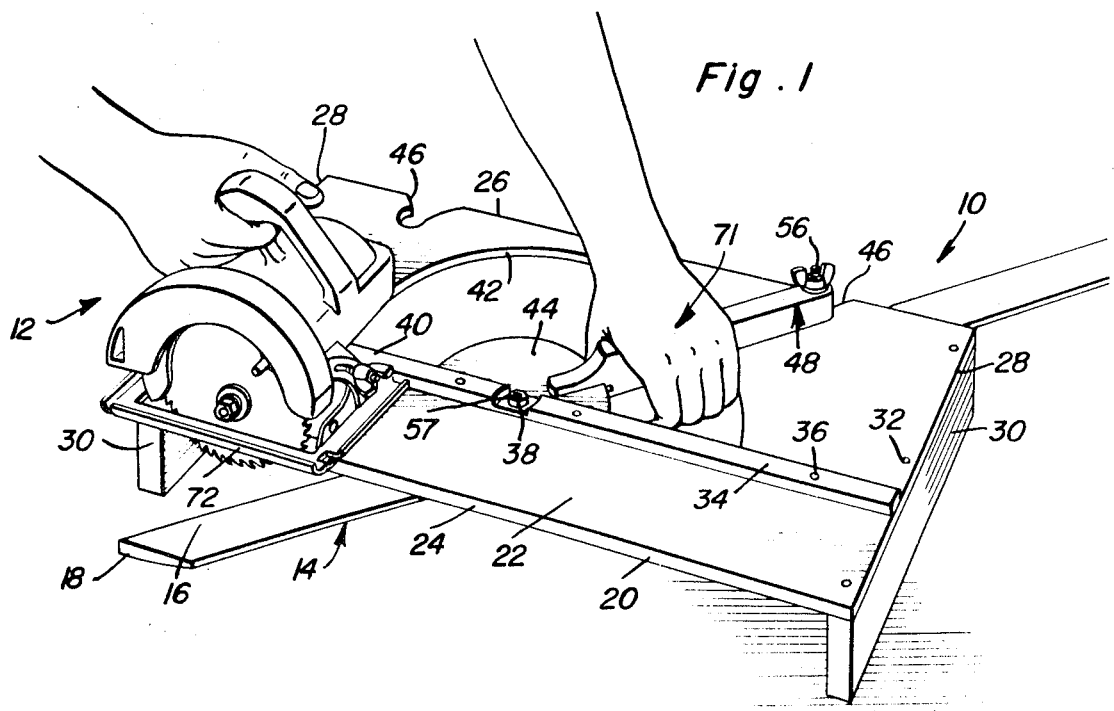
FIG. 1 is a perspective view illustrating utilization of the first embodiment to form a miter edge.
Figure 2:
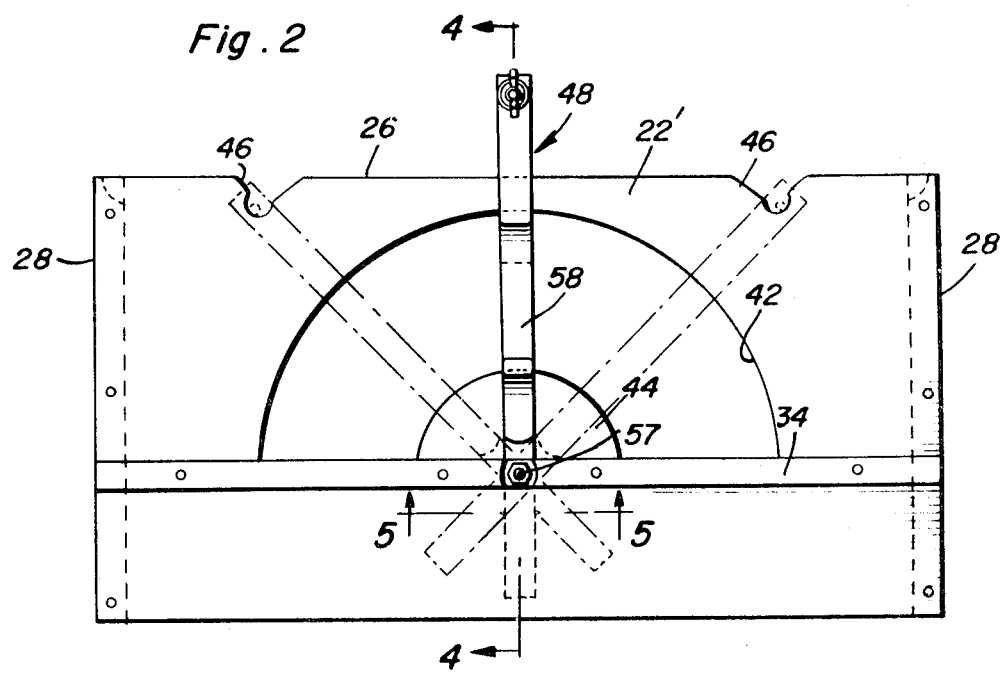
FIG. 2 is a top plan view of the present miter cutting device.

Referring specifically to the drawings and more particularly to FIG. 1, reference numeral 10 generally denotes the first miter cutting embodiment of the present invention and is shown in conjunction with a saw, preferably an electrically powered saw denoted by 12 which is guided by the device 10 to cut a mitered edge on a workpiece 14. The workpiece 14 may be characterized as an elongated strip of cuttable material, such as wood, plastic, or the like. In particular, workpiece 14 is illustrated in the form of a simple molding having a flat planar surface 16 and a contoured surface 18.

In detail, miter cutting device 10 includes a platform 20 having a top planar surface 22 and a bottom planar surface 22'. The platform further includes lateral edges 24 and 26 disposed perpendicularly to end edges 28. The platform is retained in an elevated position by vertical support members 30 suitably connected to the end edges 28 by means of nails 32 or like fasteners. An elongated rail 34 is longitudinally disposed on the top surface 22 of the platform between end edges 28. Suitable fasteners 36 such as nails, screws or the like retain the rail member in a fixed position. A medial portion of the rail member 34 includes a recess 38 for purposes to be described hereinafter.

The rail member 34 includes a lateral edge 40 positioned in confronting relation with edge 26 of the platform 20. The edge 40 forms a diametrical line for a semicircular slot 42 having an outward peripheral point adjacent platform edge 26. A semicircular extension or projection 44 is disposed in concentric relation with slot 42, the aforementioned recess 38 lying on the center of the projection 44.

Two similarly dimensioned notches 46 extend inwardly from platform edge 26, the projections being disposed at 45° and 135° with respect to the center of projection 44. These notches provide mechanical stops for a radial arm guide indicated by 48. The particular structure of radial guide arm 48 is shown in FIG. 4. An outward arm portion includes two overlying jawlike members 50 and 50' separated by a stepped elongated slit including a first portion 52 which extends inwardly to a second portion 54 that increases the flexibly yieldable nature of the jaw members 50 and 50'. The outward portion of the radial arm is further positioned to include the edge portion 26 of platform 20 within slit 52. A wing nut assembly 56 interconnects the jaw members 50 and 50' so that loosening of the wing nut assembly permits sliding movement of the radial guide arm 48 along platform edge 26. This sliding motion is more particularly rotational motion with a center defined by a second wing nut assembly 57 disposed at an opposite end of the radial guide arm 48, the wing nut assembly 57 being received within the aforementioned recess 38 formed in guide rail member 34. Thus, the radial arm guide may be adjusted to any acute angle with respect to edge 26 and then clamped in this position by means of fastening wing nut assembly 56. An intermediate length of the radial arm guide includes a tapered handlelike portion 58 which extends rearwardly to an elongated straight portion 60 retained in underlying relation with the underside 22' of platform 20. Wing nut assembly 57 retains arm portion 68 in underlying juxtaposition with undersurface 22'. A foreshortened radial arm portion 66 is disposed in overlying juxtaposition with the top surface 22 of platform 20. A slit 62 is formed between these arm portions 60 and 66 to permit the insertion of the semicircular projection 44 therein. Slit 62 is extended longitudinally inwardly to a second slit 64 of smaller dimension than the first slit 62 thereby serving to increase the flexible nature of the spaced arm portions 60 and 66.

In operation of the device, radial guide arm 48 is angularly positioned with respect to platform edge 26 to form a preselected miter cut in workpiece 14. The wing nut assembly 56 is fastened thereby setting the angular position of the radial guide arm 48. Next, the workpiece is positioned under platform 20 in edgewise contacting relation with radial guide arm 48. The workpiece is maintained against the radial guide arm by means of manually holding the two together, the user's hand passing through semicircular slot 42 and engaging the handle portion 58 of the radial guide arm 48 as indicated by 71 in FIG. 1. The guide of a power saw 12 is positioned against guide rail member 34 so that the blade of the saw engages the edge 24 of platform 20. The blade is then guided along this edge until the workpiece is cut at the preselected angle.

Figure 6:
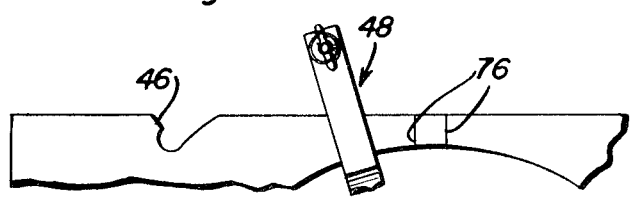
FIG. 6 is a partial top plan view illustrating an intermediate position of an adjustable radial guide means of the present invention.

It will be noted from FIG. 6 that radial arm 48 may be received within notch 46 which conveniently sets a conventional 45° miter cut. Further, guide lines 76 are marked on the top surface 22 of the platform 20 to indicate the position in which radial arm 48 will effect a 90° cut across the workpiece. Although no angular scale is shown, it will of course be appreciated that such a protractor-type scale may be provided on the top surface 22 of platform 20 in order to facilitate relatively precise angular orientation of the radial guide arm 48.

When the radial guide arm 48 is disposed in either notch 46, a conventional 45° miter cut is formed. For purposes of illustrative convenience, FIG. 10 shows such a cut on a workpiece strip having a rectangular cross section. As will be noted from the figure, the workpiece indicated by 14a includes a miter edge 74a which is cut at 45° with respect to the longitudinal edges of the workpiece.

In many cutting operations, it is desired to cut a miter edge at a compound angle, particularly when molding is to be cut. By forming a compound miter cut, the rear surfaces of the molding are undercut so that the forward miter edges assume intimate abutment thereby enhancing the finished appearance of a facing miter joint. To better understand the formation of a compound angle, reference is made to FIGS. 11 and 12, FIG. 11 illustrating the top plan view of a workpiece 14b which is seen to include an undercut edge 75 formed at an angle $\theta$, as indicated. FIG. 12 illustrates a front elevational view of the compound angle edge which slopes downwardly and outwardly so that a lower edge 77 protrudes with respect to an upper edge 75. The slope angle is designated as angle $\Phi$. Thus, as will be appreciated, when two workpiece strips having compound angle edges are fitted together, it is possible to position the strips so that the rearwardly confronting edges are spaced from one another while the forwardly confronting edges are maintained in intimate abutment. In order to enable the cutting of a compound angle with the present invention, two axially disposed pin members 78 shown in FIG. 5 are received within radial arm 48 along a portion thereof below undersurface 22'. Thus, by pinning a molding strip 14 to pin member 78 as shown by reference numeral 82, the planar surface 16 of the molding is angularly disposed with respect to the platform underside 22'. When the outer portion of the molding is cut, the formed edge will include an inclined surface such as 74b shown in FIG. 12. Thus, when the radial guide arm 48 is disposed in an acute angular position, a mitered edge is formed which resembles the compound angle edge shown in FIGS. 11 and 12.

It will be appreciated, that a workpiece 14 may be pinned by pin 78 so that the planar surface 16 of the workpiece is retained in underlying juxtaposition with undersurface 22' of platform 20. In this position, the mitered edge will be formed in a conventional (noncompound angle) manner.

Figure 7:
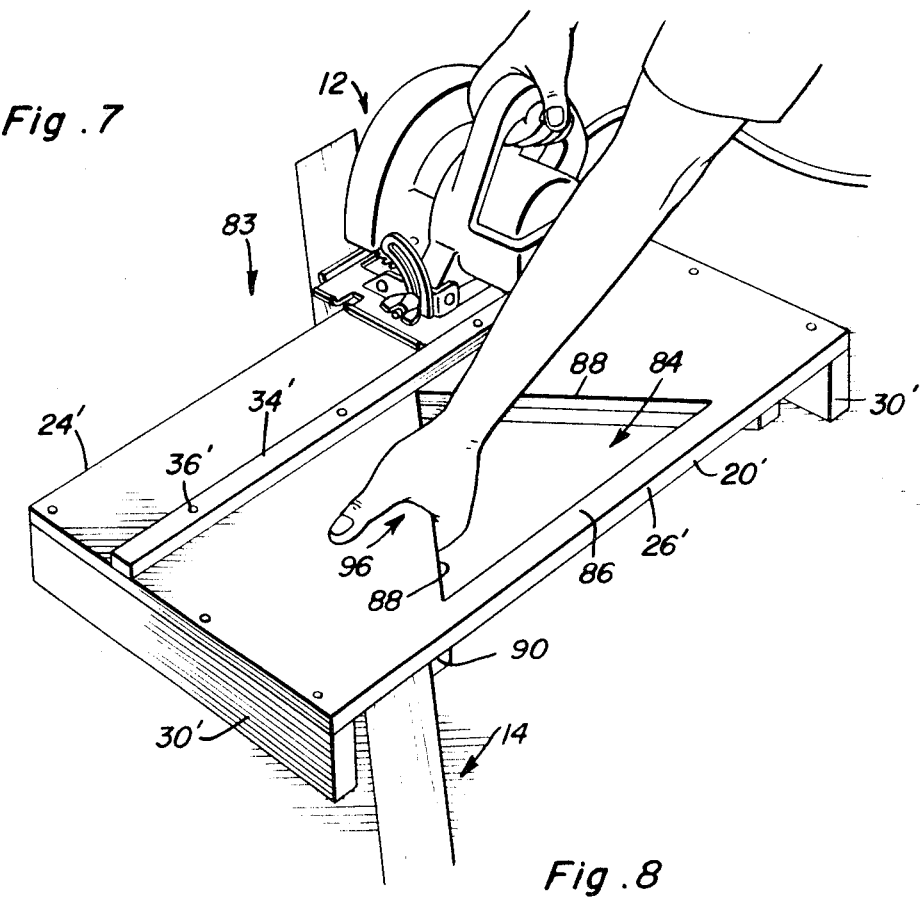
FIG. 7 is a perspective view illustrating utilization of the second embodiment for forming a miter edge on a workpiece.
Figure 8:
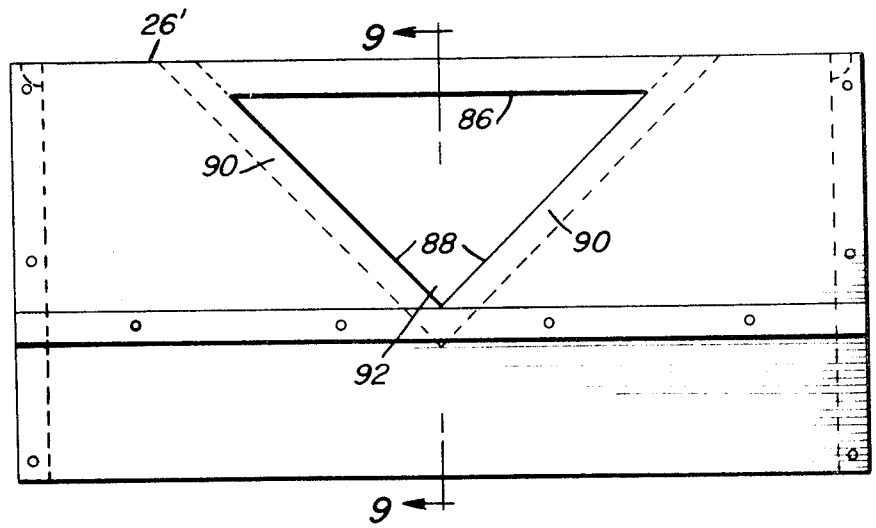
FIG. 8 is a top plan view of the second embodiment.
Figure 9:
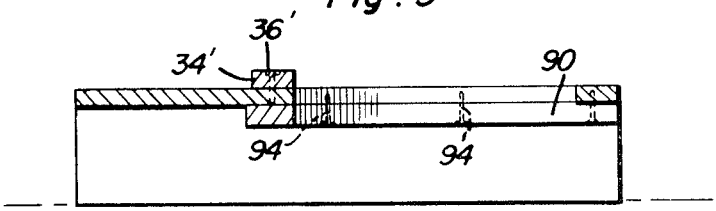
FIG. 9 is a transverse sectional view taken along a plane passing through section line 9-9 of FIG. 8.

The second embodiment of the present invention is shown in FIG. 7 and is generally represented by reference numeral 83. Briefly, the second embodiment is similar to the first insofar as it includes an identical raised platform structure 20' having component portions identical to that of the present invention and distinguished by the inclusion of primed numerals. A first distinction resides in the configuration of the central slot which in the present instance is in the form of an isosceles right triangle generally denoted by 84. The triangular slot includes a base side 86 disposed in parallel spaced relation from platform edge 26'. The remaining sides of the slot are denoted by reference numeral 88. As clearly illustrated in FIG. 8, rail members 90 are positioned in edgewise relation with the sides 88 of the triangular slot. The apex of the slot and surrounding rail members form a right angle indicated by 92. The outward ends of the rail members 90 are mitered so that they coincide with edge 26'. As seen in FIG. 9, rail members 90 are fastened to the undersurface of the platform by means of suitable fasteners 94.

In operation of the device, a workpiece is disposed along an outer edge of a preselected rail member 90 so that the workpiece extends laterally outwardly from the underside of the platform thereby facilitating the cutting thereof by a power saw 12. The triangular slot permits a user to manually clamp the workpiece as indicated by reference numeral 96 against the abutting rail member 90 while the cutting operation is performed. As will be appreciated, the triangular formation of the guide members guarantees a suitable 45° miter cut. After the mitered edge is formed, the workpiece is merely released by hand after which it is ready to be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What I claim as new is as follows:

1. A miter box comprising a platform having a saw guide mounted in offset relation from a platform edge so that the side of an electric saw may abut against the guide to insure linear motion of the saw blade along the platform edge, a workpiece guide attached to said platform, the guide extending beneath and directly connected to the platform for positioning the workpiece in abutting underlying relation to the platform, and an opening formed in the platform adjacent the guide to permit manual access to the guide for manual clamping of a workpiece against the workpiece guide.

2. The structure as set forth in claim 1 wherein the workpiece guide is pivotally mounted and angularly adjustable to permit the formation of an acute angle miter edge on a workpiece.

3. The structure of claim 2 wherein the opening is generally semicircular, the center of the opening being concentric with means for pivotally mounting the workpiece guide.

4. The structure set forth in claim 1 including a pin member extending laterally outwardly from the workpiece guide to pierce and support a workpiece, said pin member enabling the workpiece to be vertically and angularly offset with respect to the plane of said platform thereby permitting the formation of a compound angular cut across a workpiece.

5. The structure of claim 1 wherein the opening is characterized as slot means formed in said platform for permitting a hand to pass therethrough, and further wherein the workpiece guide includes rail means disposed around said slot means, a workpiece being disposed in edgewise abutment with a preselected rail means, whereby the workpiece is clamped against the rail means by a user's grip.

6. The device set forth in claim 5 wherein said slot means assumes the configuration of an isosceles right triangle, and further wherein said rail means are disposed in edgewise alignment with the right angle arm portions of said slot.